United States Patent Office 3,330,675
Patented July 11, 1967

3,330,675
FOAMED CERAMIC
Jules Magder, Cleveland, Ohio, assignor to Horizons Incorporated, a corporation of New Jersey
No Drawing. Filed Feb. 5, 1964, Ser. No. 342,771
5 Claims. (Cl. 106—40)

This invention relates to a light weight insulating ceramic material and to the manner in which it is formed. More particularly it relates to improvements over the ceramic compositions described in copending United States patent application Ser. No. 161,426, filed Dec. 22, 1961, now abandoned Like the compositions described in the above noted patent application, the ceramic compositions of this invention are capable of being foamed and formed into useful porous cellular products without the application of heat from any external source.

A specific object of this invention is to modify the compositions described in the above noted patent application in order to obtain products which have improved physical properties as compared with the products obtainable from the compositions described in the aforesaid patent application.

The compositions described and claimed in said patent application comprise the following essential constituents:
 (a) A liquid vehicle, water being preferred;
 (b) An acidic phosphate selected from the group consisting of acidic aluminum phosphate, acidic calcium phosphate and acidic zirconium phosphate, the acidic aluminum phosphate being preferred;
 (c) A finely divided calcium silicate; and
 (d) A small amount of a gas liberating chemical.

Briefly in the present invention other "basic" compounds of suitable reactivity, as hereinafter defined, are substituted for the calcium silicate in the foam compositions with the result that a substantial increase in cold-setting bond strength, softening temperature, and resistance to cracking at elevated temperatures are obtained.

More specifically, in accordance with the present invention, a solution of acid aluminum phosphate of suitable composition is mixed with a "basic compound" of suitable reactivity as defined below, of an element selected from the group consisting of magnesium, zirconium, strontium, barium, aluminum, lithium, and iron, or mixtures of these compounds, in the presence of a substance which liberates a gas during or after the mixing process, and of which the liberation of the gas is substantially completed prior to the setting or hardening of the mixture into a solid mass.

THE ACID PHOSPHATE

The preferred acid phosphate in practicing this invention is an acid aluminum phosphate although both the calcium and zirconium phosphates described in U.S. Ser. No. 161,426 may also be used in place of the acid aluminum phosphate.

A suitable composition for the acid aluminum phosphate solution is one in which the ratio of $Al_2O_3:P_2O_5$ is greater than 1 to 5 but less than 1 to 2, expressed as moles, and in which the ratio of $H_2O:P_2O_5$ is greater than approximately 5 to 1, but less than approximately 15 to 1, also expressed as moles. In thus specifying the suitable range of composition of the acid aluminum phosphate solution, the total composition of the solution has been expressed in terms of the ratios of the three oxides $Al_2O_3$, $P_2O_5$ and $H_2O$. It has been found that when an acid aluminum phosphate solution with a ratio of $Al_2O_3:P_2O_5$ appreciably less than 1 to 5 is employed, the heat of the reaction with the basic compound is so great that volatilization of water, and consequent collapse of the foam, occur on mixing. On the other hand, with ratios of $Al_2O_3:P_2O_5$ appreciably greater than 1 to 2, it has been found that the viscosity of the acid aluminum phosphate solution is so great that sufficiently thorough mixing is impossible.

In practice, it has been found that once the ratio of $Al_2O_3:P_2O_5$ has been selected, the preferred range for the ratio of $P_2O_5:H_2O$ for the acid aluminum phosphate solution may be deduced experimentally, by ascertaining the quantity of water necessary to give a viscosity for the solution in the range of 800 to 6000 centipoises at 72° F., as measured, for example, with a Brookfield Viscosimeter using a number 4 spindle at 60 r.p.m.

THE BASIC COMPOUND

By "basic compound" is meant a compound of an element selected from the group consisting of magnesium, zirconium, strontium, barium, aluminum, lithium, and iron, selected from the group consisting of oxides, hydroxides, silicates, and carbonates, or mixtures or solid solutions of such compounds. It is evident that a number of minerals fall into this classification, such as wollastonite, talc, asbestos, zircon, olivine, etc. In the practice of the present invention basic compounds of magnesium and zirconium represent preferred species because when used in the composition, the resulting foams have enhanced physical properties as compared with the foams resulting from the use of wollastonite as the basic compound.

By "suitable reactivity" of the basic compound, is meant that when equivalent amounts of the basic compound and the acid aluminum phosphate solution are mixed at temperatures above 60° F. but below 220° F., the mixture sets to a solid, monolithic, tack-free mass within periods less than about ½ hour, but greater than about 1 minute.

The approximate minimum ratio of the quantity of "basic compound" or mixture of basic compounds, to that of the acid aluminum phosphate solution may be calculated according to the following formula:

$$E_b \text{ equals } E_{P_2O_5} \text{ minus } E_{Al_2O_3}$$

where $E_b$ is the total number of equivalents of "basic compound" or mixtures of "basic compounds," and $E_{P_2O_5}$ and $E_{Al_2O_3}$ are each the number of equivalents of $P_2O_5$ and $Al_2O_3$, respectively, contained in the required quantity of the acid aluminum phosphate solution.

For purposes of this calculation, the number of equivalents of a compound, or mixture of compounds, is determined as the sum of the equivalents contributed by the constituent oxides present; the equivalent weight of a constituent oxide is in turn determined by multiplying its formula weight by the factor given in the table below.

| Oxide: | Factor to determine equivalent weight |
|---|---|
| $P_2O_5$ | ⅙ |
| $Al_2O_3$ | ⅙ |
| CaO | ½ |
| $ZrO_2$ | ¼ |
| MgO | ½ |
| $Li_2O$ | ½ |
| SrO | ½ |
| BaO | ½ |
| ZnO | ½ |
| FeO | ½ |
| $Fe_2O_3$ | ⅙ |
| $Fe_3O_4$ | ⅛ |

It will be noted that the oxides, hydroxides, silicates and carbonates comprising said basic compound, the oxides $SiO_2$, $H_2O$ and $CO_2$ are considered to contribute nothing to the number of equivalents present.

In practice, when calculating the minimum quantity of "basic compound," it is to be understood that the foaming agent is to be considered as a "basic compound" if such foaming agent partially neutralizes the equivalent excess of $P_2O_5$ in the acid aluminum phosphate solution. In the case of a metallic foaming agent such as aluminum or zinc, the equivalent weight of such metal is calculated as that weight which yields an equivalent of the oxide of the metal, as defined above.

It is thus readily seen that for a given quantity of acid aluminum phosphate solution the minumum total quantity of "basic compounds" in formulations which constitute the present invention is that quantity which corresponds to complete neutralization of the excess $P_2O_5$ present in the acid aluminum phosphate solution. In practice, optimum quantities of "basic compounds" are found to be slightly greater than the minimum quantity, but do not exceed the quantities which give a readily mixable paste when initially combined with the acid aluminum phosphate solution in the presence of the foaming agent.

THE GAS FORMING AGENT

Suitable gas-forming agents include (a) carbonates, in particular the carbonates of calcium, magnesium, strontium, barium, lithium, ammonium, and iron; (b) metals such as aluminum, magnesium, zinc and iron each of which reacts with phosphoric acid with the liberation of hydrogen; (c) compressed or liquefied gases or volatile liquids, such as compressed air, nitrogen, carbon dioxide, trichloromonofluoromethane, dichlorodifluoromethane; (d) hydrogen peroxide, ammonium nitrite and N,N'-dimethyl-N,N'-dinitrosoterephthalamide, or other similar gas forming, readily decomposable compounds.

The metal compounds or ammonium compounds are "basic compounds" since they can react with or form products which react with the phosphoric acid. The other gas forming compounds are "neutral" in the sense that they do not engender partial neutralization of the excess $P_2O_5$ present in the acid aluminum phosphate solution.

To ascertain the quantity of foaming agent for a given total weight of formulation, a knowledge of the gas-forming reaction facilitates calculation of the total theoretical quantity of gas produced, and hence, the resulting contribution of the liberated gas to the specific volume of the foam.

For the indicated carbonates as foaming agents, the gas-forming reaction is:

$$M_2CO_3 + 2H^+ \rightarrow CO_2 + 2M^+ + H_2O$$

wherein M is an equivalent of the metal of which the carbonate is employed.

For the indicated metals, the gas-forming reaction is:

$$2M' + 2H^+ \rightarrow H_2 + 2M'^+$$

wherein M' is an equivalent of the metal which is employed as the foaming agent.

For the indicated compressed gases or liquids, the gas-forming reaction consists merely of expansion of the gas to its final pressure prior to the solidification of the foam, without the formation of by-products. For the listed decomposable compounds, the gas-forming reactions are, respectively,

and

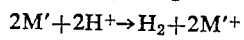

and

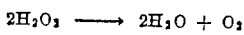

In practice, a sufficient quantity of gas-forming agent is used to provide a specific volume of the foam in the range of approximately between 10 and 1 cubic centimeters per gram, that is to say, a density in the range of approximately 6.2 to 62 pounds per cubic foot in the foamed product.

The following examples are intended to illustrate, but not to restrict, embodiments of the present invention.

Example 1

Part A: Parts by weight
   Acid aluminum phosphate solution with ratio
      $Al_2O_3:P_2O_5:H_2O = 0.8:3:26.0$ -------------- 39

Part B:
   Wollastonite, minus 325 mesh ---------------- 53
   Aluminum hydroxide, light grade ------------ 6
   Aluminum metal -------------------------- 2

To prepare the foam, part B is pre-blended and then mixed with part A for a period of not more than two minutes. This composition foams and sets in about 10 minutes to a density of 35 pounds per cubic foot. The compressive strength is about 450 pounds per square inch.

Examples 2 and 3

| | Example 2—Parts by Weight | Example 3—Parts by Weight |
|---|---|---|
| Part "A": | | |
|   Acid aluminum phosphate solution, with $Al_2O_3:P_2O_5:H_2O=0.8:3:18.5$ | 55 | 55 |
|   50% aqueous benzyl trimethyl ammonium chloride solution | | 0.05 |
| Part "B": | | |
|   Talc, minus 200 mesh | 42 | 44 |
|   Aluminum powder, pigment grade | 3 | 1 |

Parts A and B are pre-blended separately and then mixed for a period preferably not greater than about 3 minutes. The mixture is transferred to a suitable mold, where foaming begins in about five minutes after mixing is completed; the mixture then becomes hot and sets to a rigid cellular mass. Example 2 yields a foam density of about 30 pounds per cubic foot, and Example 3, 42 pounds per cubic foot.

A freshly prepared specimen of Example 2 may be shock-heated to 2400° F. without any significant change in strength or in linear dimensions, as illustrated in Table 2.

TABLE 2.—EFFECTS OF SHOCK-HEATING A 3-INCH CUBE SPECIMEN OF FOAM, PREPARED ACCORDING TO EXAMPLE 2 FOR 15 MINUTES AT 2400° F

| | Freshly Prepared | Shock-Heated at 2,400° F. |
|---|---|---|
| Density, lbs. per cu. ft | 30 | 26.5 |
| Compressive strength, lbs. per sq. in | 510 | 600 |
| Length of edge, inches | 3.0 | 2.9 |

Example 4

Part A: Parts by weight
   Acid aluminum phosphate solution, with ratio
      $Al_2O_3:P_2O_5:H_2O = 1.0:3.0:23.5$ ---------- 63
   Polydimethylsiloxane fluid, 100 centistoke grade (Dow Corning DC-200) ---------- 0.10

Part B:
   Chrysotile asbestos, grade 7T -------------- 27
   Barium carbonate, minus 200 mesh --------- 8
   Magnesium oxide, light grade ------------- 2

To prepare the foam, parts A and B are preblended separately, the latter preferably by means of a twin-shell type of dry blender; the parts are then mixed, and allowed to foam and set for about 24 hours at about 70° F. The density of the product is about 26 pounds per cubic foot, and the compressive strength about 800 pounds per square inch.

Example 5

Part A:                                     Parts by weight
  Acid aluminum phosphate solution, with ratio
    $Al_2O_3:P_2O_5:H_2O=0.9:3.0:23.5$ _____ 25
  Silicone fluid, Dow Corning DC–113 _____ 0.05

Part B:
  Zircon, minus 200 mesh _____ 68.5
  Aluminum hydroxide, light grade _____ 5
  Aluminum metal _____ 1.5

To prepare the foam, parts A and B are pre-blended separately and then mixed together for a period preferably not more than 4 minutes. The composition begins to foam about 5 minutes after the mixing is completed, and sets in about 10 minutes to a density of 55 pounds per cubic foot. The compressive strength of the foam is about 650 pounds per square inch, and the softening temperature is about 3300° F.

An apparatus particularly suitable for producing the foamed ceramics of this invention is described in an application Ser. No. 342,730 filed of even date herewith and now abandoned.

I claim:
1. A composition which when the several ingredients are brought together is capable of setting into a porous monolithic ceramic mass without the application thereto of any heat from an external source, said composition consisting essentially of:

a first constituent consisting of an aqueous solution of an acidic aluminum phosphate in which the relative molar proportions of $Al_2O_3:P_2O_5$ is greater than 1:5 and less than 1:2 and in which the relative molar proportions of $H_2O:P_2O_5$ is greater than 5:1 and less than 15:1;

and a second constituent consisting of at least one basic compound selected from the group consisting of the carbonates, oxides, hydroxides and silicates of a metal selected from the group consisting of magnesium and zirconium;

and a gas producing material selected from the group consisting of the carbonates of Ca, Mg, Sr, Ba, Li, $NH_4$ and Fe; the metals Al, Mg, Zn and Fe; compressed gases and liquids; and readily decomposable compounds which form gases at room temperature when brought into contact with the remaining constituents of the composition; the relative number of equivalents of basic compound in said composition being equal to the number of equivalents of free $P_2O_5$ in said acidic aluminum phosphate.

2. The composition of claim 1 wherein the compound of magnesium is talc.

3. The composition of claim 1 wherein the compound of zirconium is zircon.

4. The composition of claim 1 wherein the gas producing material is a metal.

5. The composition of claim 4 in which the metal is aluminum.

References Cited

UNITED STATES PATENTS

| | | | |
|---|---|---|---|
| 2,992,930 | 7/1961 | Wheeler et al. | 106—40 |
| 3,148,996 | 9/1964 | Vukasovich et al. | 106—87 |

HELEN M. McCARTHY, *Primary Examiner.*